Patented Apr. 13, 1954

2,675,394

UNITED STATES PATENT OFFICE 2,675,394

ARYL ESTERS OF Bz 1-BENZANTHRONE CARBOXYLIC ACID

James M. Straley and Raymond C. Harris, Kingsport, Tenn., assignors to Eastman Kodak Company, Rochester, N. Y., a corporation of New Jersey No Drawing. Application April 2, 1951, Serial No. 218,912

7 Claims. (Cl. 260—364)

This invention relates to new vat dye intermediates and to new vat dye compounds prepared therefrom. The invention also relates to the processes for preparing the new vat dye intermediates and the new vat dye compounds of the invention.

In accordance with the invention, aryl esters of a Bz 1-benzanthrone carboxylic acid are ring closed to obtain 1-hydroxydibenzo-(a,h) pyrene-7,14-dione compounds which are alkylated to obtain 1-alkoxydibenzo-(a,h) pyrene-7,14-dione compounds. These latter compounds are stable vat dye compounds.

It is an object of the invention to provide a new vat dye intermediates which are probably aryl esters of a Bz 1-benzanthrone carboxylic acid. Another object is to provide new valuable vat dyes which are probably 1-alkoxydibenzo-(a,h) pyrene-7,14-dione compounds. A further object is to provide satisfactory processes for the preparation of the new compounds of the invention. Other objects will appear hereinafter.

The aryl esters of a Bz 1-benzanthrone carboxylic acid of the present invention are prepared by reacting a 10-methyleneanthrone compound which is unsubstituted in at least one of the 4- and 5- positions with an arylacrylate. The reaction may be carried out at varying temperatures and in various solvents but the use of a nitroaryl solvent, such as nitrobenzene, at a temperature in excess of 120° C. is preferred. These compounds are also prepared by reacting a Bz 1-benzanthrone carboxylic chloride with a phenol or a naphthol in an inert solvent at a temperature from about 25° C. to about 200° C. or in an aqueous alkaline suspension at temperatures up to 100° C.

The following equations are believed to be illustrative of the two reactions:

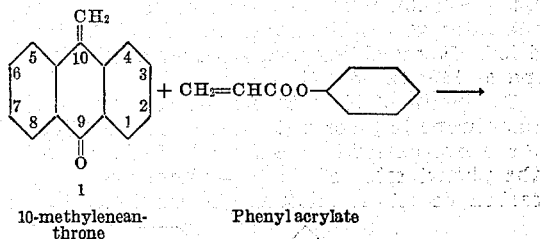

10-methyleneanthrone     Phenylacrylate

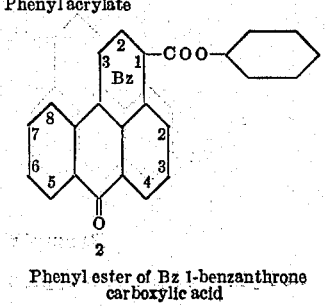

Phenyl ester of Bz 1-benzanthrone carboxylic acid

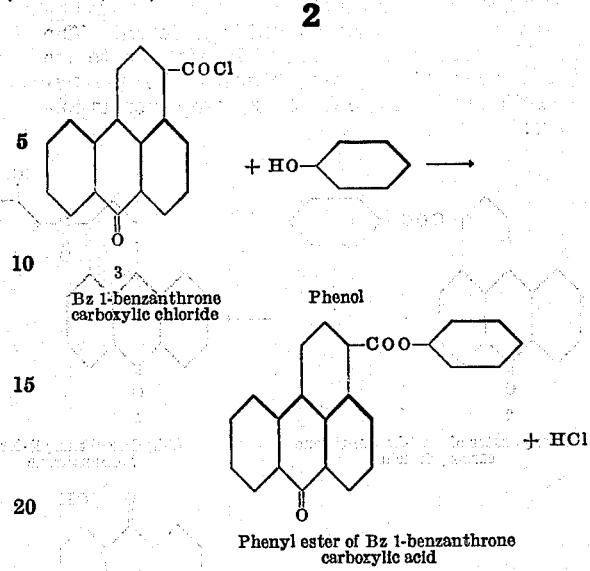

Bz 1-benzanthrone carboxylic chloride     Phenol

Phenyl ester of Bz 1-benzanthrone carboxylic acid 10-methyleneanthrone has the formula numbered 1 and is numbered as indicated. 10-methyleneanthrone compounds that can be employed include, for example, 10-methyleneanthrone, 10-methylene - 2 - chloroanthrone, 10 - methylene-1 - methylanthrone, 10 - methylene - 4 - bromoanthrone, 10 - methylene - 1 - fluoroanthrone, 10 - methylene - 3 - methylanthrone, 10 - methylene - 3 - chloroanthrone, 10 - methylene - 2-methylanthrone and 10-methylene-1-chloroanthrone.

The aryl esters of a Bz 1-benzanthrone carboxylic acid of our invention contain a —COOR group, wherein R represents an aryl nucleus such as a phenyl nucleus, a diphenyl nucleus or a naphthyl nucleus, joined to the Bz 1 position of the benzanthrone nucleus. The aryl nucleus R may be substituted with an alkyl group such as methyl or ethyl, a halogen atom such as chlorine or bromine, a hydroxy group or an alkoxy group such as methaoxy or ethoxy. The benzanthrone nucleus may also contain substituents such as those just mentioned in connection with the member R.

Dibenzo-(a,h) pyrene-7,14-dione has the formula:

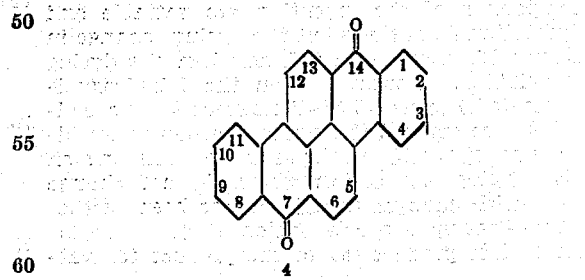

and is numbered as indicated. This compound is also known as 3,4,8,9-dibenzopyrene-5,10-quinone.

As previously indicated, the 1-hydroxydibenzo-(a,h) pyrene-7,14-dione compounds of the invention are prepared by ring closing the aryl esters of a Bz 1-benzanthrone carboxylic acid compound of the invention. The ring closure is effected by the action of AlCl₃ and is facilitated by the incorporation of a mild oxidizing agent such as $MnO_2$ in the melt. Air or oxygen can be bubbled through the melt in place of $MnO_2$. In the case of small runs the presence of air is sufficient to promote the reaction but normally the use of a mild oxidizing agent in the melt appears to be advantageous and is preferred. The reaction will be illustrated with reference to the preparation of 1-hydroxydibenzo-(a,h) pyrene-7,14-dione which is believed to take place as follows:

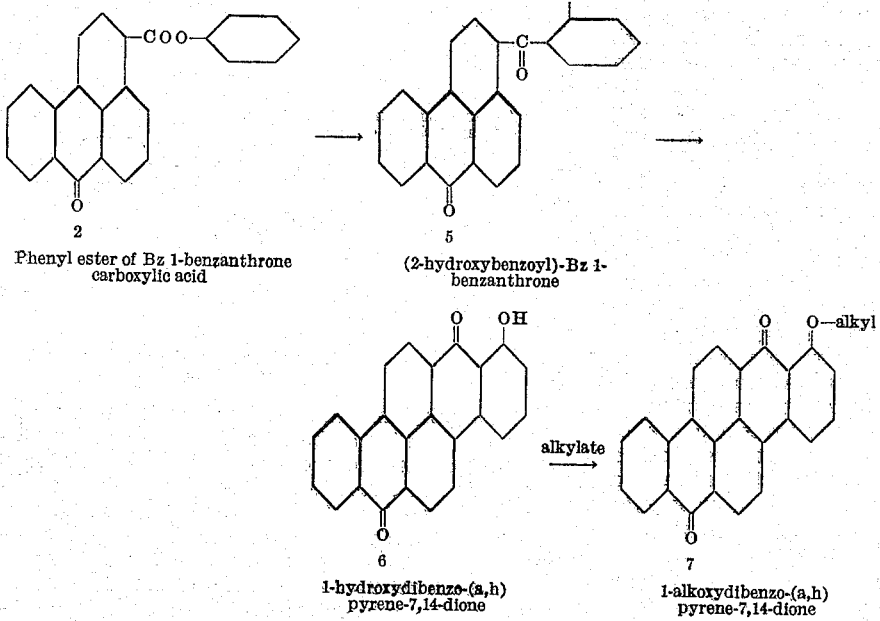

As just indicated, an intermediate product (2-hydroxybenzoyl)-Bz 1-benzanthrone is formed during the preparation of 1-hydroxydibenzo-(a,h) pyrene-7,14-dione. The synthesis can be conducted under varying conditions such that the intermediate (5) can be isolated or it can be performed in one step so that the intermediate is transformed into 1-hydroxydibenzo (a,h) pyrene-7,14-dione without isolation. In some instances what is apparently an aluminum complex of the intermediate (5) results upon interruption of the process. When ring closure is desired the temperature of the reaction preferably is above about 150° C. as ring closure is greatly retarded below 150° C.

The 1-hydroxydibenzo-(a,h) pyrene-7,14-dione compounds of the invention are vattable and dye cotton from a vat but the dyeings change in color with changes in pH, as when the dyeing is acidified. However, when the 1-hydroxydibenzo-(a,h) pyrene-7,14-dione compounds are alkylated to convert the hydroxy group to an alkoxy group, stable vat dyes are obtained which give dyeings on cotton which do not change color with changes in pH. It has been further found that upon caustic fusion of either the intermediate product (5) or the product (6) vattable nonhydroxylated substances, whose nature is at present unknown, are formed. These last substances are not obtained by caustic fusion of the product 7. They need not be alkylated to prevent changes due to variations in pH.

The new 1-alkoxydibenzo (a,h) pyrene-7,14-dione compounds dye cotton fast shades from a cold (20° C.–30° C.) or a warm (30° C.–40° C.) weakly-alkaline (only a slight excess of NaOH over the theoretical amount required to form the sodium salt of the leuco dye formed by action of hydrosulfite) vat.

The following examples illustrate the compounds of the invention and the manner in which the processes of the invention are carried out. Parts are expressed as parts by weight.

*Example 1*

60 parts of 10-methyleneanthrone, 51 parts of phenyl acrylate and 60 parts of nitrobenzene were heated together, with stirring, at 145° C.–150° C. for 3 to 4 hours. The reaction mixture was then cooled to below 100° C. and 100 parts of methanol were added, following which the reaction mixture was cooled to about 15° C. and filtered. The reaction product, phenyl ester of Bz 1-benzanthrone carboxylic acid, obtained on the filter was washed with methyl alcohol and dried. It was obtained as a yellow powder melting at 148° C.–150° C.

By the use of 70 parts of 10-methylene-2-chloroanthrone in place of 10-methyleneanthrone in the above example, a compound believed to be the phenyl ester of Bz 1-6-chlorobenzanthrone carboxylic acid is obtained. It has the formula:

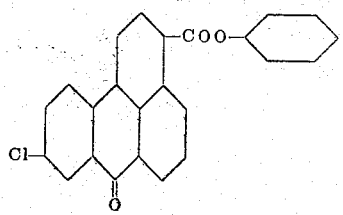

*Example 2*

62 parts of p-hydroxyphenyl acrylate, 83 parts of 10-methylene anthrone and 100 parts of nitrobenzene were heated quickly to 180° C. with stirring and maintained at 180° C. to 185° C. for 1 to 2 hours while stirring. The reaction mixture was then cooled to below 100° C. and 80 parts of methyl alcohol were added, following which the reaction mixture was filtered. The reaction product obtained on the filter was washed with methyl alcohol and dried. 45 to 65 parts of the p-hydroxyphenyl ester of Bz 1-benzanthrone carboxylic acid were obtained as a yellow-brown solid melting at 223° C.

By the use of 96.8 parts of 10-methylene-3-chloroanthrone and 114.8 parts of 10-methylene-4-bromoanthrone, respectively, in place of 10-methyleneanthrone in the above example, the compounds believed to be the p-hydroxyphenyl ester of Bz 1-7-chlorobenzanthrone carboxylic acid and the p-hydroxyphenyl ester of Bz 1-8-bromobenzanthrone carboxylic acid, respectively, are obtained.

*Example 3*

91 parts of o-chlorophenyl acrylate, 103 parts of 10-methyleneanthrone and 75 parts of nitrobenzene were heated quickly, with stirring, to 180° C. and maintained at 180° C.-185° C. for 2 hours. Some cooling was required after first reaching 180° C. as the reaction is rather exothermic. The reaction mixture was then cooled to 120° C. and 75 parts of methyl alcohol were added, following which the reaction mixture was cooled to room temperature and filtered. The reaction product obtained on the filter was washed with methyl alcohol and dried. 45 to 80 parts of the o-chlorophenyl ester of Bz 1-benzanthrone carboxylic acid were obtained as a yellowish powder, melting at 215° C.-218° C.

By the use of 110 parts of 10-methylene-1-methylanthrone and 110 parts of 10-methylene-2-methylanthrone, respectively, in place of 10-methyleneanthrone in the above example, the compounds believed to be the o-chlorophenyl ester of Bz 1-5-methylbenzanthrone carboxylic acid and the o-chlorophenyl ester of Bz 1-6-methylbenzanthrone carboxylic acid, respectively, are obtained.

*Example 4*

This was run precisely as in Example 3, using 91 parts of p-chlorophenyl acrylate instead of o-chlorophenyl acrylate. 43 to 60 parts of the p-chlorophenyl ester of Bz 1-benzanthrone carboxylic acid were obtained. It melted at 230° C.

By the use of 110 parts of 10-methylene-3-methylanthrone and 121 parts of 10-methylene-1-chloroanthrone, respectively, in place of 10-methyleneanthrone in the above example, the compounds believed to be the p-chlorophenyl ester of Bz 1-7-methylbenzanthrone carboxylic acid and the p-chlorophenyl ester of Bz 1-5-chlorobenzanthrone carboxylic acid, respectively, are obtained.

*Example 5*

30 parts of Bz 1-benzanthrone carboxylic chloride and 13 parts of o-chlorophenol were heated together, with stirring, in 200 parts of o-dichlorobenzene at 130° C. for 3 to 4 hours. The o-dichlorobenzene was then removed by steam distillation and the solid product remaining was extracted on a filter with dilute aqueous sodium hydroxide. The product remaining on the filter consists of 36 parts of the o-chlorophenyl ester of Bz 1-benzanthrone carboxylic acid.

*Example 6*

30 parts of Bz 1-benzanthrone carboxylic chloride and 11 parts of m-cresol were heated together in 200 parts of o-dichlorobenzene, with stirring, at 130° C. for 3 to 4 hours. Theo-dichlorobenzene was then removed by steam distillation and the solid remaining was extracted on a filter with dilute aqueous sodium hydroxide. The reaction product remaining on the filter consists of 33 to 35 parts of a compound believed to be the m-tolyl ester of Bz 1-benzanthrone carboxylic acid. It melted at 168° C.-169° C.

*Example 7*

This was run precisely as in Example 5, using 15 parts of α-naphthol in place of o-chlorophenol. 40 parts of a product believed to be the α-naphthyl ester of Bz 1-benzanthrone carboxylic acid were obtained. It melted at 235° C.-238° C.

*Example 8*

This was run exactly as in Example 5, using 20 parts of p-hydroxydiphenyl instead of o-chlorophenol. 41 parts of a product believed to be the p-phenylphenyl ester of Bz 1-benzanthrone carboxylic acid were obtained. It melted at 195° C.-197° C.

*Example 9*

This was run exactly as in Example 1, using 54 parts of o-tolyl acrylate in place of phenyl acrylate. 51 parts of a product believed to be the o-tolyl ester of Bz 1-benzanthrone carboxylic acid were obtained as a yellow powder melting at 141° C.-142° C.

*Example 10*

To a melt composed of 60 parts of $AlCl_3$ and 20 parts of NaCl at 150° C.-160° C. there was added slowly 10 parts of the phenyl ester of Bz 1-benzanthrone carboxylic acid. The reaction mixture was heated for an hour further at this temperature, after which the temperature of the reaction mixture was raised to 200° C. and held at this temperature for 4 hours. Then the reaction mixture was drowned in water and filtered. The product obtained on the filter was washed with water and, upon drying, 8.5 parts of a high melting, nonvattable product were obtained. The product is believed to be (2-hydroxybenzol)-Bz 1-benzanthrone.

By the use of an equivalent amount of the phenyl ester of Bz 1-6-chlorobenzanthrone carboxylic acid in place of the phenyl ester of Bz 1-benzanthrone carboxylic acid in the above example, (2-hydroxybenzoyl)-Bz 1-6-chlorobenzanthrone is obtained.

*Example 11*

The (2-hydroxybenzoyl)-Bz 1-benzanthrone obtained as described in Example 10 was added to a melt composed of 60 parts of $AlCl_3$ and 20 parts of NaCl at 150° C.-160° C. and 7 parts of $MnO_2$ (80%) were added. The temperature of the reaction mixture was raised to 260° C.-280° C. and maintained at this temperature for 4 to 8 hours. Upon drowning in water, filtering and purification with sodium hypochlorite, a product was obtained which dyes cotton a brown shade from a red vat. The product thus obtained is believed to be 1-hydroxydibenzo-(a,h) pyrene 7,14-dione having the formula numbered 6. Acidification of the dyed fabric gave a reddish-orange dyeing. The dyestuff dissolves with a violet-brown color in concentrated $H_2SO_4$.

By the use of (2-hydroxybenzoyl)-Bz 1-6-chlorobenzanthrone in place of (2-hydroxybenzoyl)-Bz 1-benzanthrone in the above example, the vattable compound 1-hydroxy-9-chloro-dibenzo-(a,h) pyrene-7,14-dione is obtained.

*Example 12*

0.5 part of cuprous chloride and 14 parts of fused potassium acetate were added to 10 parts of 1-hydroxydibenzo-(a,h) pyrene-7,14-dione in 75 parts of nitrobenzene. The reaction mixture was stirred and heated at 150° C. and 24 parts of methyl p-toluenesulfonate were added dropwise and the temperature held at 150° C.–160° C. for 3 hours. The reaction mixture was then cooled and 75 parts of methyl alcohol were added, following which the reaction mixture was filtered and the product obtained on the filter was washed first with methyl alcohol and then with hot water and dried at 110° C. 8.5 parts of a product believed to be 1-methoxydibenzo-(a,h) pyrene-7,14-dione were obtained as a brown powder. The product is soluble in concentrated $H_2SO_4$ with a violet color and dyes cotton in orange-brown shades from a red vat. The dye compound obtained, as above described, has a fastness of 72 hours in the Fadeometer.

By the use of an equivalent amount of 1-hydroxy-9-chloro-dibenzo-(a,h) pyrene-7,14-dione in place of 1-hydroxydibenzo-(a,h) pyrene-7,14-dione in the above example, the vat dye compound 1-methoxy-9-chloro-dibenzo-(a,h) pyrene-7,14-dione is obtained.

*Example 13*

40 parts of the p-chlorophenyl ester of Bz 1-benzanthrone carboxylic acid were added to a melt of 150 parts of $AlCl_3$ and 50 parts of NaCl maintained at 140° C.–150° C. and, after the addition, the reaction mixture was held for 2 hours at this temperature. 20 parts of $MnO_2$ (80%) were added and the temperature of the reaction mixture was raised to 200° C. and maintained at this temperature for 3 hours. After drowning in water, filtering and purification with sodium hypochlorite, there were obtained 35 parts of a product believed to be 1-hydroxy-3-chlorodibenzo-(a,h) pyrene-7,14-dione which is soluble in concentrated $H_2SO_4$ with a green color. It has the formula:

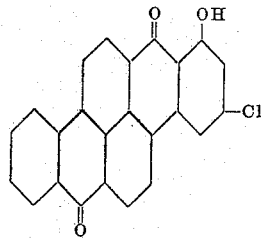

and dyes cotton a brown shade from a red vat. Acidification of the dyed fabric gives a reddish-orange shade.

*Example 14*

20 parts of the product of Example 13, 150 parts of nitrobenzene, 20 parts of anhydrous potassium carbonate and 0.5 parts of cuprous chloride were heated together to 90° C. and then 45 parts of methyl p-toluenesulfonate were added during the course of 1 hour. The temperature of the reaction mixture was maintained at 110° C.–120° C. for 10 hours, after which it was cooled slightly and 100 parts of methyl alcohol added. The reaction mixture was filtered and the product collected on the filter was washed first with methyl alcohol and then with hot water and dried at 110° C. 18 parts of a product believed to be 1-methoxy-3-chloro-dibenzo-(a,h) pyrene-7,14-dione which dyes cotton a fast orange shade from a reddish-violet vat were obtained. The fastness to light of the dyeing obtained with the dye compound of this example is apparent from the fact that it withstood 136 hours of a Fadeometer before beginning to fade. The dye dissolves in concentrated $H_2SO_4$ with a blue color.

*Example 15*

39 parts of the o-chlorophenyl ester of Bz 1-benzanthrone carboxylic acid were added to a melt composed of 150 parts of $AlCl_3$ and 50 parts of NaCl at 110° C.–120° C. After the addition the temperature of the reaction mixture was maintained at 180° C.–185° C. for 2 hours. Then the reaction mixture was drowned in water, filtered, and the product obtained on the filter was washed with water to obtain 40 parts of a green powder which is apparently an aluminum complex of the desired hydroxychlorophenyl benzanthrone ketone.

*Example 16*

20 parts of the product of Example 15 and 10 parts of $MnO_2$ were added to a melt composed of 75 parts of $AlCl_3$ and 25 parts of NaCl at 150° C. The temperature of the reaction mixture was then maintained at 200° C.–210° C. for 2.5 hours, following which the reaction mixture was worked up as described in Example 13. There were thus obtained 15 parts of a product dyeing cotton a brown shade from a red-brown vat. The color of the dyeing is sensitive to changes in pH, giving an orange shade upon acidification. The dyestuff obtained dissolves in concentrated $H_2SO_4$ with a violet-brown color.

*Example 17*

A well-stirred mixture of 10 parts of the product of Example 16, 10 parts of anhydrous potassium carbonate, 20 parts of methyl p-toluenesulfonate, 0.5 part of cuprous chloride and 75 parts of nitrobenzene were heated at 150° C.–160° C. for 4 to 5 hours. The reaction mixture thus obtained was worked up in accordance with the procedure described in Example 12 to obtain 6 to 8 parts of a product dyeing cotton a very fast, bright orange shade from a deep red vat. The dyeing has a fastness to light of about 96 hours. The dye product dissolves in concentrated $H_2SO_4$ with a violet color.

*Example 18*

By the use of an equivalent amount of the ethyl p-toluenesulfonate in place of the methyl p-toluenesulfonate in Example 17, 5 to 8 parts of a vat dye product dyeing cotton somewhat duller shades of orange than the product of Example 17 were obtained.

*Example 19*

10 parts of the p-hydroxyphenyl ester of Bz 1-benzanthrone carboxylic acid were added to a melt composed of 75 parts of $AlCl_3$ and 25 parts of NaCl at 150° C.–160° C. After 1.5 hours at this temperature, 5 parts of $MnO_2$ were added and the temperature of the reaction mixture was maintained at 195° C.–205° C. for 3 hours. The reaction mixture was then worked up as described in Example 17. The product thus obtained contained a considerable quantity of a nonvattable material. This nonvattable material was removed and the desired dyestuff was isolated by vatting at 60° C. in 1000 parts of water containing 15 parts of NaOH and 15 parts of sodium hydrosulfite, filtering and blowing out the filtrate. 4 to 6 parts of a brown powder which dyes cotton brown shades from a violet vat were thus obtained. Its color in concentrated $H_2SO_4$ is black. The product of this example is believed to be 1,3-dihydroxydibenzo-(a,h) pyrene-7,14-dione.

*Example 20*

25 parts of the product of Example 19 were heated for 2 hours with 75 parts of nitrobenzene, 14 parts of potassium carbonate, 0.5 part of cuprous chloride and 50 parts of methyl p-toluenesulfonate at 145° C.-150° C. The reaction mixture was worked up in accordance with the procedure described in Example 16 to obtain 15 parts of a product dyeing cotton violet shades from a green vat. The dyeing obtained had a light fastness of about 72 hours. The vat dye compound obtained is believed to be 1,3-dimethoxy-dibenzo-(a,h) pyrene-7,14-dione.

*Example 21*

35 parts of the o-tolyl ester of Bz 1-benzanthrone carboxylic acid were added to a melt of 150 parts of $AlCl_3$ and 50 parts of NaCl at 140° C.-150° C. and after the addition the reaction mixture was maintained for 2 hours at this temperature. 20 parts of $MnO_2$ (80%) were added and the temperature of the reaction mixture was raised to 200° C. and maintained at this temperature for 3 hours. The reaction mixture was then drowned in water, filtered and purified by treatment with sodium hypochlorite. 32 parts of a product dyeing cotton in brown shades from a red vat were obtained. The dyestuff thus obtained dissolved in concentrated $H_2SO_4$ with a violet-brown color.

*Example 22*

The product obtained as described above in Example 21 was alkylated with methyl p-toluenesulfonate in accordance with the procedure described in Example 3. The vat dye product obtained dyes cotton orange shades from a red vat. The dyeings obtained with the vat dye product of this example had a light fastness of about 96 hours.

*Example 23*

10 parts of the product of Example 12 were added at 120° C.-130° C. to a melt composed of 50 parts of KOH and 25 parts of ethyl alcohol. The temperature of the reaction mixture was brought to 145° C. and held at 145° C.-150° C. for 3 hours. The melt was then cooled and drowned in water and air-blown until complete precipitation of the dye product was effected. The reaction mixture was then filtered and the product obtained on the filter was washed with water and dried. 8 parts of a vattable dye product soluble in concentrated $H_2SO_4$ with a bright blue color and dyeing cotton fast brown shades from a red-violet vat were obtained. The dyeings thus obtained were unaffected by changes in pH and had a fastness to light of about 72 hours.

*Example 24*

10 parts of the product of Example 19 were added at 120° C.-130° C. to a melt composed of 50 parts of KOH and 25 parts of ethyl alcohol. The temperature of the reaction mixture was brought to 145° C.-150° C. for 3 hours. The cooled melt was drowned in water and air-blown until complete precipitation of the dye product was effected. The reaction mixture was then filtered and the product obtained on the filter was washed with water and dried. 6 parts of a product soluble in concentrated $H_2SO_4$ with a brown color and which dyes cotton tan shades from a brown vat were obtained. The dyeings had a light fastness of about 72 hours.

*Example 25*

10 parts of the product of Example 13 were added at a temperature of 120° C.-130° C. to a melt composed of 50 parts of KOH and 25 parts of ethyl alcohol. The temperature of the reaction mixture was brought to 145° C. and held at 145° C.-150° C. for 3 hours. The cooled melt was drowned in water and air-blown until complete precipitation of the desired dye product was effected. The reaction mixture was then filtered and the product obtained on the filter was washed with water and dried. 8.5 parts of a product soluble in concentrated $H_2SO_4$ with a blue color and dyeing cotton violet shades from a red vat were obtained. The dyeings had a fastness to light of about 84 hours and were unaffected by changes in pH.

The fusion reactions, such as those described in Examples 23, 24 and 25, may be performed at temperatures of from about 100° C. to about 200° C., but that in the range of about 140° C.-150° C. the fusion is complete in a shorter time than when a lower temperature is used. Although a temperature as high as about 200° C. can be employed, there seems to be little, if any, advantage in using a temperature above 150° C. and, accordingly, the use of temperatures in the range of about 140° C.-150° C. is preferred.

By light fastness is meant the number of hours a dyeing can be exposed in a Fadeometer before it begins to fade. Thus, a light fastness of about 72 hours means that the dyeing can be exposed for about 72 hours in the Fadeometer before fading occurs.

The phenyl acrylate compounds used in the preparation of the aryl esters of a benzthrone carboxylic acid compounds of the invention are prepared by reacting acrylyl chloride with an alkali metal salt of a phenol which may be substituted, for example, with a hydroxy group, an alkyl group such as methyl or ethyl, a halogen atom such as chlorine or bromine or an alkoxy group such as methoxy or ethoxy. Although various techniques for the reaction can be employed, it is preferred to react acrylyl chloride with the sodium salt of the phenol in the presence of an inert diluent such as benzene, toluene or chlorobenzene. The sodium salt of the phenol is conveniently prepared by reacting the phenol with sodium methoxide. The following examples illustrate the manner of preparation of the phenyl acrylate compounds.

*Example 26*

40.7 parts of p-dihydroxybenzene and 20.1 parts of sodium methoxide were added to 300 parts of dry benzene. The reaction mixture resulting was stirred and refluxed and the methyl alcohol formed during the reaction was removed by azeotropic distillation. When the reaction was complete, the reaction mixture was cooled to 20° C. and then 33.6 parts of acrylyl chloride were added slowly with vigorous stirring. After 3 hours of uncontrolled reaction, the mixture was refluxed for 3 hours and filtered while hot. The filtrate was concentrated in vacuo to incipient crystallization and cooled strongly. After filtration and drying, there were obtained 61 parts of p-hydroxyphenyl acrylate melting at 78° C. Its solution in CCl₄ adds bromine without evolution of HBr.

*Example 27*

128.5 parts of o-chlorophenol, 54 parts of sodium methoxide, 650 parts of toluene and 90 parts of acrylyl chloride were reacted together in accordance with the procedure described in Example 26. 142 parts of o-chlorophenyl acrylate boiling at 95° C./5 mm. $N_D^{20}=1.5330$ were obtained. Its solution in CCl₄ adds bromine without elimination of HBr.

*Example 28*

By the use of 128.5 parts of p-chlorophenol in place of o-chlorophenol in Example 27, 131 parts of p-chlorophenyl acrylate, boiling at 96° C.—98° C./5 mm. $N_D^{20}=1.5425$ were obtained. Its solution in CCl₄ adds bromine without elimination of HBr.

We claim:

1. A compound having the general formula:

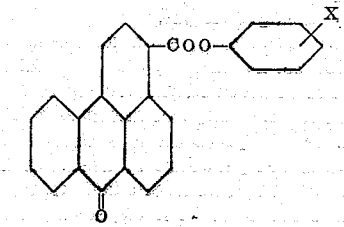

wherein X represents a member selected from the group consisting of a hydrogen atom, a chlorine atom, a hydroxy group and a methyl group.

2. The phenyl ester of Bz 1-benzanthrone carboxylic acid.

3. The p-hydroxyphenyl ester of Bz 1-benzanthrone carboxylic acid.

4. The p-chlorophenyl ester of Bz 1-benzanthrone carboxylic acid.

5. The o-chlorophenyl ester of Bz 1-benzanthrone carboxylic acid.

6. The α-naphthyl ester of Bz 1-benzanthrone carboxylic acid.

7. A compound having the general formula:

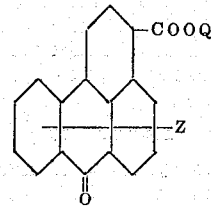

wherein Q represents a member selected from the group consisting of an unsubstituted diphenyl nucleus, an unsubstituted naphthyl nucleus and a

group wherein X represents a member selected from the group consisting of a hydrogen atom, a chlorine atom, a hydroxy group and a methyl group and Z stands for a member selected from the group consisting of a hydrogen atom, a chlorine atom, a bromine atom, a fluorine atom and a methyl group.

References Cited in the file of this patent

UNITED STATES PATENTS

| Number | Name | Date |
|---|---|---|
| 1,693,447 | Kranzlein et al. | Nov. 27, 1928 |

FOREIGN PATENTS

| Number | Country | Date |
|---|---|---|
| 597,325 | Germany | May 1932 |

OTHER REFERENCES

Houben, Das Anthracen und die Anthrachinone, page 572 (1929), George Thieme, Verlag Leipzig.

Elsevier's Encyclopedia of Ortanic Chemistry, vol. 13, Series 111, page 373 (1940).